(12) United States Patent
Miao

(10) Patent No.: US 6,744,832 B2
(45) Date of Patent: Jun. 1, 2004

(54) ANALOG-TO-DIGITAL CONVERTER BANK BASED ULTRA WIDEBAND COMMUNICATIONS

(76) Inventor: George J. Miao, 2 Inverness Dr., Marlboro, NJ (US) 07746

(*) Notice: Subject to any disclaimer, the term of this patent is extended or adjusted under 35 U.S.C. 154(b) by 3 days.

(21) Appl. No.: 10/200,961

(22) Filed: Jul. 23, 2002

(65) Prior Publication Data

US 2004/0017306 A1 Jan. 29, 2004

(51) Int. Cl.[7] ............................................... H04B 1/10
(52) U.S. Cl. ..................... 375/349; 455/12.1; 455/13.3; 455/226
(58) Field of Search ............................... 341/155, 159; 455/12.1, 13.3, 226, 275, 266, 132, 303, 137, 552, 561, 553; 370/330, 334, 341, 342, 346, 349; 375/270, 301, 302

(56) References Cited

U.S. PATENT DOCUMENTS

| | | | | |
|---|---|---|---|---|
| 5,280,636 A | * | 1/1994 | Kelley et al. ................ | 455/131 |
| 5,404,375 A | * | 4/1995 | Kroeger et al. .............. | 375/142 |
| 5,640,698 A | * | 6/1997 | Shen et al. ................... | 455/323 |
| 5,745,846 A | * | 4/1998 | Myer et al. .................. | 455/209 |
| 5,956,620 A | * | 9/1999 | Lazaris-Brunner et al. | 455/12.1 |
| 6,101,399 A | * | 8/2000 | Raleigh et al. .............. | 455/561 |
| 6,167,099 A | * | 12/2000 | Rader et al. ................. | 375/347 |
| 6,301,465 B1 | * | 10/2001 | Kintis et al. ................ | 455/12.1 |
| 6,363,262 B1 | * | 3/2002 | McNicol ...................... | 455/561 |
| 2003/0021367 A1 | * | 1/2003 | Smith .......................... | 375/346 |

* cited by examiner

Primary Examiner—Michael J. Tokar
Assistant Examiner—Linh V Nguyen

(57) ABSTRACT

An analog-to-digital (A/D) converter bank with digital down conversion (DDC) is used to substitute a very-high-speed A/D converter for the UWB transceiver. The A/D converter bank has flexibility and scalability operation functions including the number of low-speed A/D converters, adaptive amplifiers, digital FIR filters or one Mth frequency band digital FIR filter, with operating in parallel, as well as analyzed sequence and synthesized sequence switches. The A/D converter bank for the UWB transceiver has a aliasing free and does not have a phase distortion. The DDC, which has scalability to deal with a multirate operation, is used to shift bandpass signals into baseband signals and decimate the baseband signals according to different down samplings. The A/D converter bank with DDC is invented to decrease the computational complexity of resulting calculations, thereby making the UWB transceiver system amenable to use in a very high frequency sampling sensitive applications and in those situations where the available processor's performance is relatively limited.

20 Claims, 7 Drawing Sheets

ANALOG-TO-DIGITAL CONVERTER BANK BASED ULTRA WIDEBAND COMMUNICATIONS

BACKGROUND

This invention relates generally to ultra wideband communications.

Ultra wideband communications (UWB) is true digital radio communication; completely unlike the radios we listen to and communicate every day. UWB is a wireless broadband communications technology fundamentally different from all other radio frequency (RF) communications. UWB achieves wireless broadband communication without using a RF carrier. Instead, UWB is a sequence of very short electrical pulses, billionths of a second long, which exist not on any particular frequency but on all frequencies simultaneously. UWB uses modulated pulses with less one nanosecond in duration. The modulated pulse is usually assigned a digital representation of 0 or 1 to the transmitted and received pulse based on where the pulse is place in time. The key to turning the digital pulses into wireless broadband communication lies in the timing of the pulses. In order to hear the information in that code, a UWB receiver has to know the exact pulse sequence used by the transmitter.

Each pulse can exist simultaneously across an extensive band of frequencies if the distributed energy of the pulse at any given frequency exists in the noise floor. Therefore, UWB can co-exist with RF carrier-based communications with no discernable interference. This opens vast new communications with providing tremendous wireless bandwidth to ease the growing bandwidth crunch.

The U.S. Federal Communications Commission (FCC) on Feb. 14, 2002 authorized limited commercial use of wireless devices based on a communication technology called ultra wideband. The FCC's restrictions require that commercial ultra wideband devices must operate in radio spectrum in the frequency ranges from 3.1 GHz to 10.6 GHz. UWB communication devices should also satisfy by Part 15.209 rule, which set emission limits for operation.

UWB communication transceivers can transfer information data at rates of 100 mega-bit per second (Mbps) to 1 giga-bit per second (Gbps), with sending repeated ultra-short pulse signals across distances as great as 500 feet, even up to 2 kilometers.

With transmitting repeated ultra-short pulse signals for the high data rate up to 1 Gbps in the frequency ranges from 3.1 to 10.6 GHz, an analog-to-digital (A/D) converter should operate at very high sampling rate $F_s$ so that UWB communication receiver can implement in a digital domain. Usually, the sampling rate $F_s$ must be greater than two-time the highest frequency $F_{max}$ in the ultra-short pulse signals. This may lead to have a difficult problem to design an A/D converter with such high-speed operation in an UWB communication transceiver.

In addition, digital down conversion (DDC) should shift the bandpass ultra-shout pulse signals of the output of the A/D converter into the baseband signals and perform the decimation of the baseband signals with high sampling rate into low sampling rate due to the repeated pulse signals during transmitting.

Thus, there is a continuing need for an A/D converter bank with operating at a lower-speed to substitute a very-high-speed A/D converter along with a digital down conversion for a digital UWB communication transceiver.

SUMMARY

In accordance with one aspect, an A/D converter bank based UWB receiver comprises a low noise amplifier (LNA) coupled to an anti-aliasing analog filter, an A/D converter bank with a sampling frequency rate of $F_s$, a digital down conversion coupled to a rake receiver and a channel estimate, a template pulse generator coupled to the rake receiver to calculate a correlation between a received monocycle pulse and an ideal monocycle pulse, a sequence generator coupled to the template pulse generator, a synchronization coupled to the template pulse generator, and a clock control coupled to the A/D converter bank, the digital down conversion and the template pulse generator.

Other aspects are set forth in the accompanying detailed description and claims.

BRIEF DESCRIPTION OF THE DRAWINGS

FIG. 7 has the exact output comparing with the output as shown in FIG. 6, but the present invention as shown in FIG. 7 is different from the present invention in FIG. 6.

DETAILED DESCRIPTION

Figure 1:
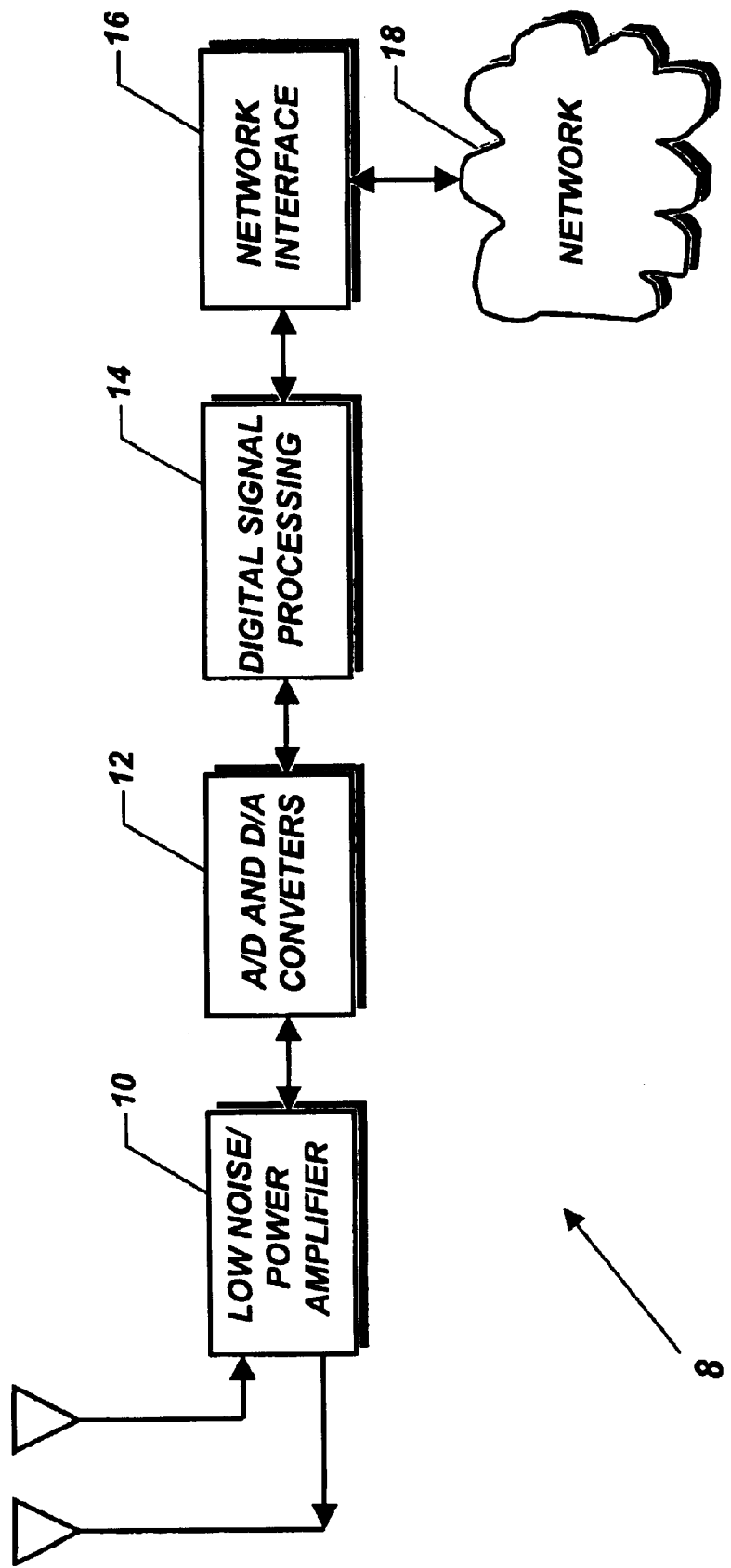
FIG. 1 is a block diagram of showing one embodiment of an UWB communication transceiver in accordance with the present invention.

Referring to FIG. 1, an UWB communication transceiver 8 in accordance with one embodiment of the present invention includes a low-noise amplifier (LNA) and power amplifier (PA) section 10, which is coupled to transmitting and receiving antennas. The low-noise amplifier/power amplifier section 10 is coupled to an A/D and D/A converter section 12. The A/D and D/A converter section 12 is coupled to the digital signal processing section 14. The digital signal processing section 14 is coupled to a network interface section 16. The network interface 16 interfaces with Ethernet network 18. In accordance with one embodiment of the present invention, the system 8 is a so-called ultra wideband communication transceiver that both transmits and receives speech, audio, image, and video and data information by using a sequence of the ultra-short pulses.

Figure 2:
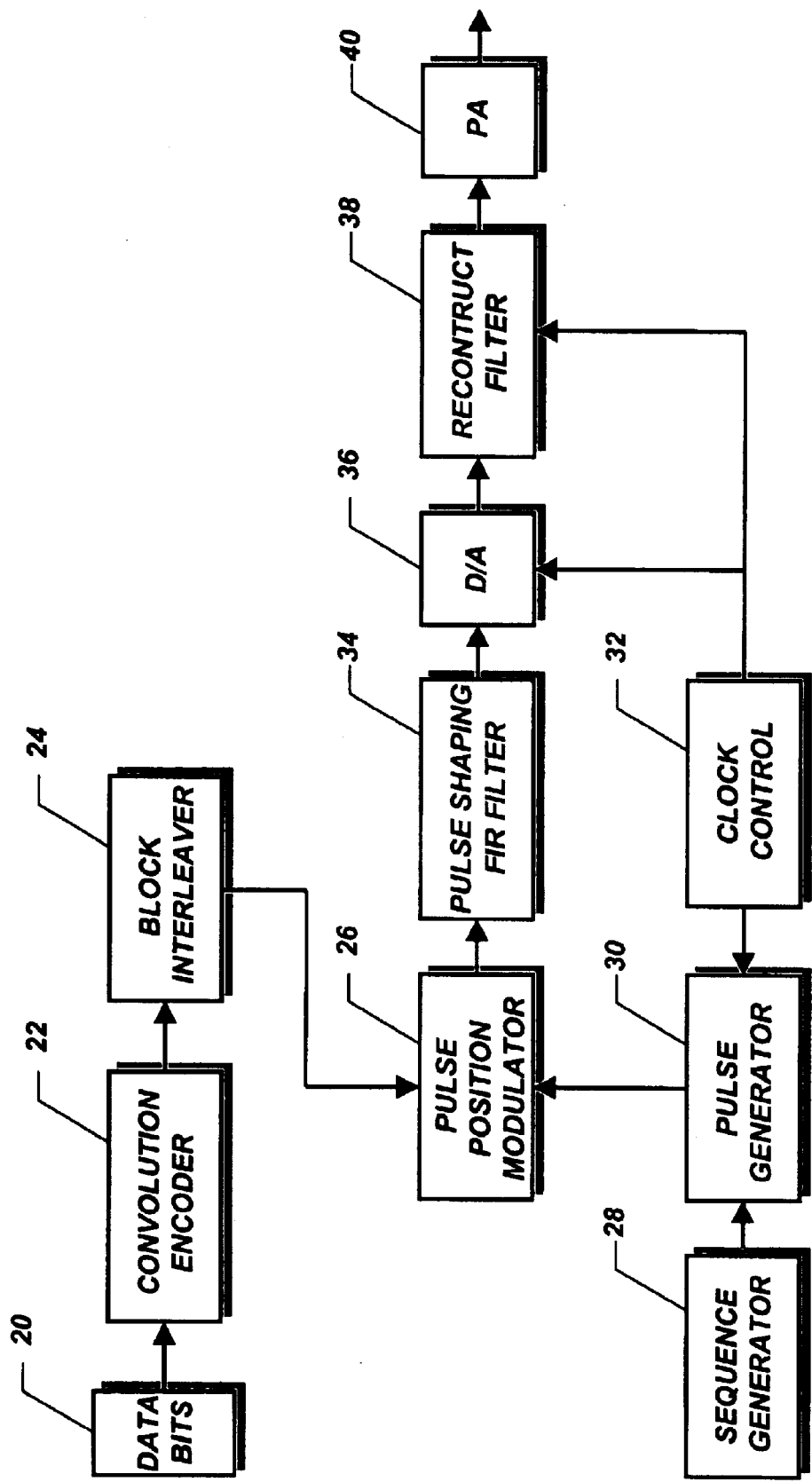
FIG. 2 is a block diagram of showing a transmitter section of the UWB communication transceiver as shown in FIG. 1.

A dedicated physical channel of showing transmitter in the UWB communication transceiver, as shown in FIG. 2, receives dedicated physical data channel 20 user data bits, such as information data at 1 Gbps. The information data 20 is passed through a one-second-rate convolution encoder 22 that may produce the double data rate of 2 giga-symbols per second (Gsps) by adding redundancy. The data is then interleaved and produced 2 Gsps by using a block interleaver 24. Thus, the output data symbols from the block interleaver 24 are modulated by using a pulse position modulation (PPM) 26, which is able to produce eight digital Gaussian-monocycle pulses based on one symbol data. The PPM technique 26 is to assign a time-window, and shift the position of the Gaussian-monocycle pulses within the window in time. The sequence generator 28 is a time-hopping encoding sequence generator. Using the sequence generator 28 and the clock control 32 controls the pulse generator 30 to produce the ultra-short Gaussian monocycle pulses and the pulse position in time for the PPM technique 26. The output ultra-short Gaussian-monocycle pulses from the PPM 26 are then passed through the pulse-shaping digital FIR filter 34 to create the frequency spectrum of the pulses in which can meet the FCC's requirements. Then, the output pulses from the pulse-shaping digital FIR filter 34 are used for the digital-to-analog (D/A) converter 36, which is operated at the sampling frequency of 22 gigahertz (GHz). The analog reconstruct filter 38, which is a bandpass filter, is used for reconstructing the analog ultra-short pulse signals. Thus, the analog pulse signals from the output of the analog reconstruct filter 38 is passed the power amplifier 40 through an antenna into air.

The transmitter in an UWB communication transceiver, as shown in FIG. 2, can also transmit the dedicated physical data channel 20 user data bits with scalability, such as information data of 50 Mbps, 100 Mbps, 200 Mbps, 250 Mbps, and 500 Mbps. In these cases, the PPM 26 produces 160, 80, 40, 32, 16 ultra-short Gaussian-monocycle pulses based on one symbol data for the information data of 50 Mbps, 100 Mbps, 200 Mbps, 250 Mbps, and 500 Mbps, respectively.

Figure 3:
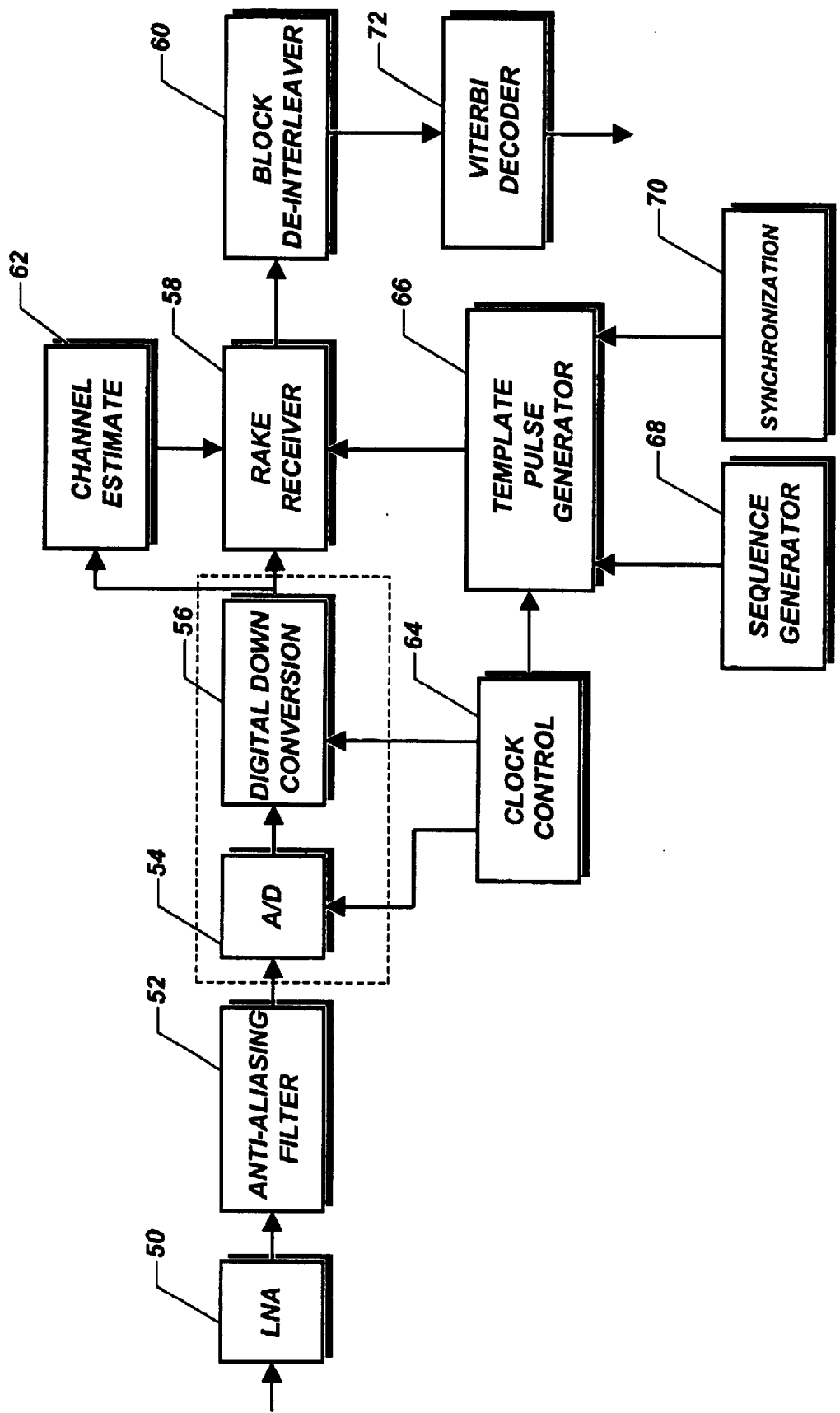
FIG. 3 is a block diagram of the receiver section of the UWB communication transceiver as shown in FIG. 1.

Referring to FIG. 3, which is the dedicated physical channel of showing the receiver in an UWB communication transceiver, the LNA 50 receives the ultra-short Gaussian-monocycle pulses from an antenna. The analog signals are passed through the analog anti-aliasing filter 52, which is a bandpass filter. The bandlimited analog signals are then sampled and quantized by using an A/D converter 54, with the sampling rate at 22 GHz. The digital bandpass signals of the output of the A/D converter 54 are then shifted into the baseband signals with down sampling by eight by using the digital down conversion (DDC) 56. Thus, the DDC 56 produces the digital data of 2 Gsps. Both the A/D converter 54 and the DDC 56 are controlled by the clock control 64. The output data from the DDC 56 is used for the channel estimate 62, and the rake receiver 58. The channel estimate 62 is used to estimate the channel phase and frequency that are passed into the rake receiver 58. The rake receiver 58 calculates the correlation between the received ultra-short pulses and the template pulses, which are generated by using the template pulse generator 66, and performs coherent combination. The template pulse generator 66 is controlled by three functions: clock control 64, sequence generator 68, and synchronization 70. The output of the rake receiver 58 is passed through the block de-interleaver 60. Thus, the output data of the block de-interleaver is used for the Viterbi decoder 72 to decode the encoded data and produce the information data of 1 Gbps.

The receiver in an UWB communication transceiver, as shown in FIG. 3, can also receive the symbol data with scalability to produce the information data of 50 Mbps, 100 Mbps, 200 Mbps, 250 Mbps, and 500 Mbps. In these cases, the DDC 56 has to shift the bandpass ultra-short pulse signals into baseband signals, and performs the down sampling by a factor of 160, 80, 40, 32, and 16, respectively.

Figure 4:
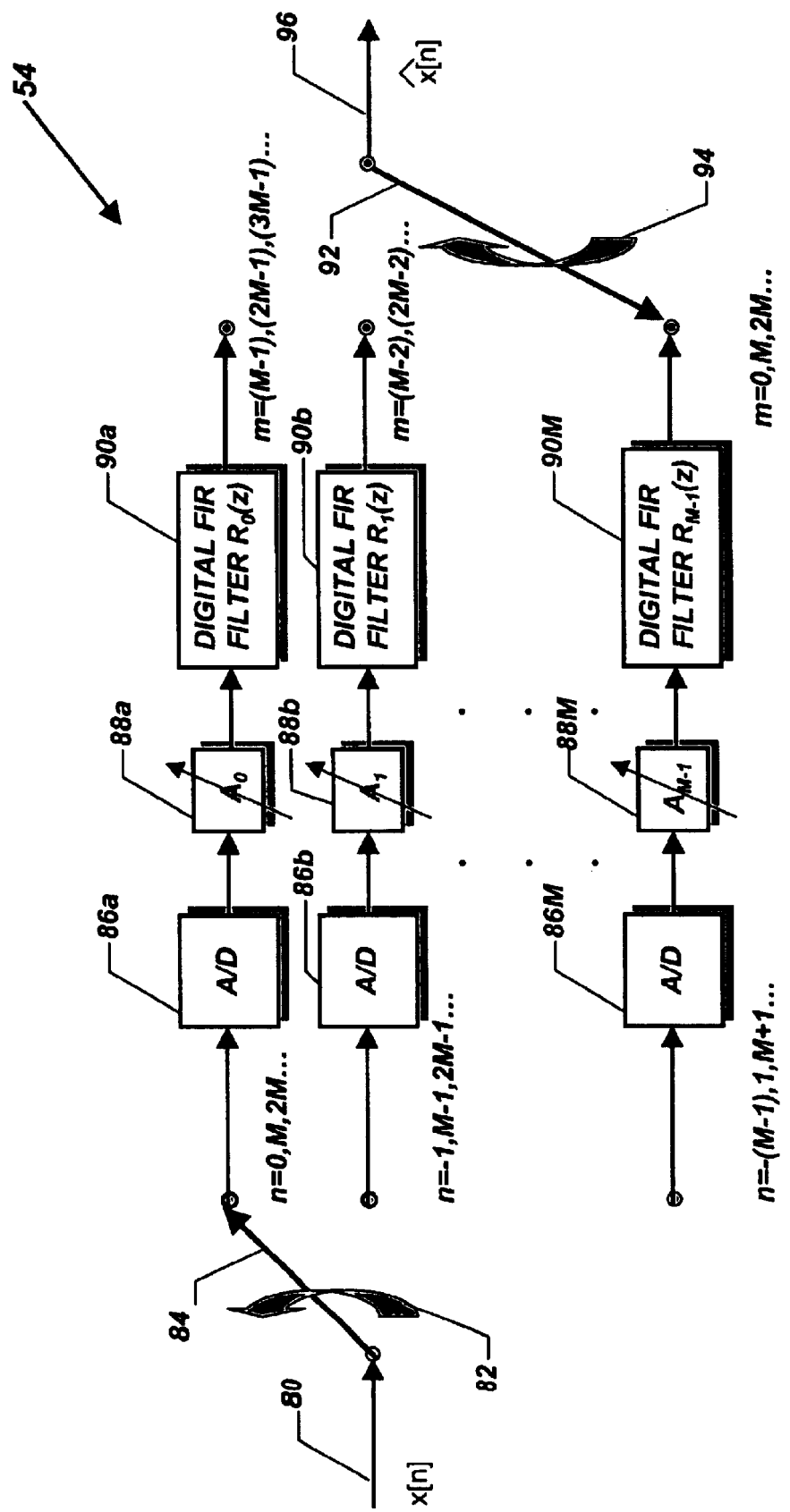
FIG. 4 is a block diagram of showing one embodiment of the present invention of the A/D converter bank, including an analyzed sequence switch, a synthesized sequence switch, a set of A/D converters, a set of adaptive amplifiers, and a set of digital FIR filters, with operating in parallel.

An effective flexibility and scalability analog-to-digital (A/D) converter bank 54, as shown in FIG. 4, is used to substitute a very-high-speed A/D converter 54 in FIG. 3. The A/D converter bank 54, shown in FIG. 4, contains forty low-speed A/D converters 86a-86M, forty adaptive amplifiers 88a-88M, forty digital FIR filters 90a-90M, with operating in parallel, as well as one analyzed sequence switch 80, 82, 84, and one synthesized sequence switch 92, 94, 96.

The A/D converter bank 54, shown in FIG. 4, is to first decompose the analog bandpass signals into subband signals by using the analyzed sequence switch 80, 82, 84. The analyzed sequence switch 80, 82, 84 is a counterclockwise commutator-model circuit that is equivalent to polyphase implementation for downsampling. The analyzed sequence switch 80, 82, 84 rotates at uniform speed and takes on the forty positions in the way as shown in FIG. 4. The analog bandpass signals are achieved the downsampling of forty for each branch by using the analyzed sequence switch 80, 82, 84, and sampled by forty low-speed A/D converters 86a-86M in parallel. Each one of low-speed A/D converters 86a-86M is sampled at a sampling rate of 550 MHz with 8-bit resolution. Thus, these analog bandpass signals are converted into the digital subband signals, with non-overlapping frequency bands of bandwidth $F_s/40$. The digital subband signals are parallel passed through the forty different adaptive amplifiers 88a-88M, and forty different digital FIR filters 90a-90M. Then these digital subband signals are sequentially rotated for polyphase implementation of upsampling by using the synthesized sequence switch 92, 94, 96 to recover the desired sampling rate $F_s$ and to obtain the digitally reconstructed signals.

The forty adaptive amplifiers 88a-88M are used for eliminating the gain error within the A/D converter bank due to the mismatch problem among the forty A/D converters 86a-86M, and for reducing the narrow interference as well due to other radio operation within the frequency band from 3.1 GH to 10.6 GHz.

As shown in FIG. 4, the adaptive amplifiers $A_k$ (k=0, 1, 2, . . . 40) 88a-88M are mainly used to compensate and reduce the gain error among all of the A/D converters 86a-86M since all of the A/D converters 86a-86M are not exactly equal in practical implementation. Furthermore, K out of 40 adaptive amplifiers, where K is an integer and is less than 40, are setting to −50 dBm to reduce the narrow interference within the A/D converter bank, such as the interference of IEEE WLAN 802.1la in the frequency ranges from 5.15 GHz to 5.35 GHz and from 5.725 GHz to 5.825 GHz.

For the digital filter bank $R_k(z)$, (where k=0, 1, 2, . . . 40), 90a-90M, as shown in FIG. 4, the z-transform function $X(z)$ is expressed in terms of $\hat{X}(z)$ as follows:

$$\hat{X}(z) = \left(\frac{z^{-(M-1)}}{M}\right)\left(\sum_{i=0}^{M-1} X(zW_M^i)\right)\left(\sum_{k=0}^{M-1} R_k(z^M)W_M^{-ki}\right), \quad (1)$$

where $W_M = e^{-j2\pi/M}$. So, the A/D converter bank system 54 in FIG. 4 is alias-free if and only if, $$\left(\sum_{k=0}^{M-1} R_k(z^M)W_M^{-ki}\right) = 0, 1 \leq i \leq M-1. \quad (2)$$

Because of $W_M W^*_M = MI$, equation (2) can be rewritten as $$\begin{bmatrix} R_0(z) \\ R_1(z) \\ \vdots \\ R_{M-1}(z) \end{bmatrix} = W_M \begin{bmatrix} R(z) \\ 0 \\ \vdots \\ 0 \end{bmatrix}. \quad (3)$$

This implies that the A/D converter bank system 54 is aliasing free if $R_k(z) = R(z)$, for all of k.

Thus, under the condition of equation (4), the z-transform function $\hat{X}(z)$ in FIG. 4 is given by $$\hat{X}(z) = z^{-(M-1)}R(z^M)X(z), \quad (5)$$

where $R(z^M)$ is a Mth frequency band digital FIR filter of R(z). Thus, for the A/D converter bank 54 as shown in FIG. 4, the aliasing is completely canceled. However, this A/D converter bank system 54 has amplitude distortion $$T(z) = z^{-(M-1)}R(z^M). \quad (6)$$

The amplitude distortion can also be canceled if the filter $R(z^M)$ is one allpass filter. The A/D converter bank system 54 does not have phase distortion since the digital filter R(z) is a FIR filter with a linear phase. In addition, the FIR filter R(z) is able to eliminate the narrow interference of other radio operations within each branch of the A/D converter bank 54 in FIG. 4.

Figure 5:
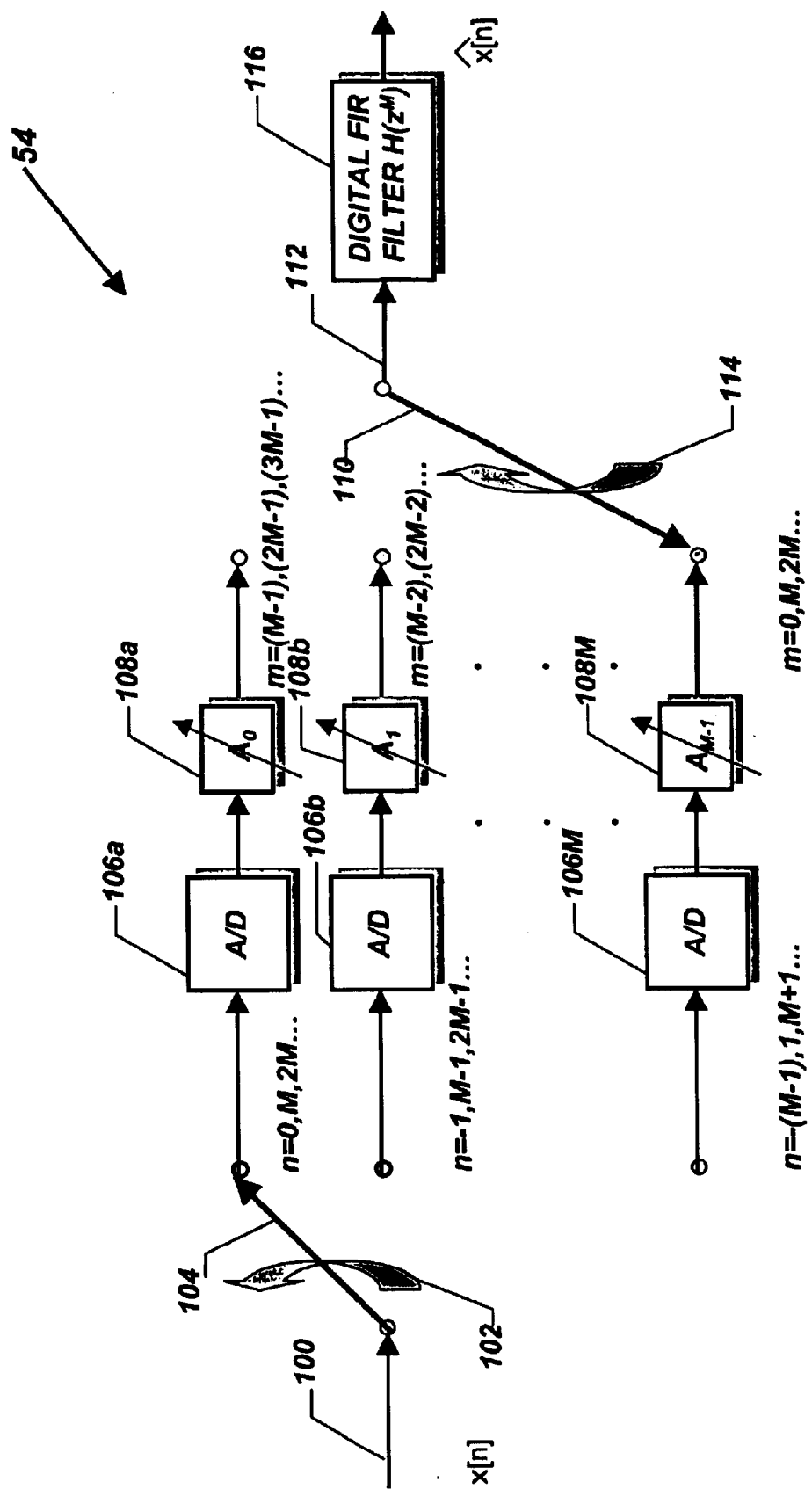
FIG. 5 is a block diagram of showing one embodiment of the present invention of another A/D converter bank, including an analyzed sequence switch, a synthesized sequence switch, a set of A/D converters, a set of adaptive amplifiers, with operating in parallel, and one Mth-band digital FIR filter.

In accordance with another embodiment of the present invention, instead of using the forty different digital FIR filters 90a–96M with operating in parallel for the A/D converter bank in FIG. 4, another present invention of this A/D converter bank system 54, as shown in FIG. 5, uses only one Mth frequency band digital FIR filter $H(z^M)$ 116 after the synthesized sequence switch 110, 112, 114. Thus, memory of the filter coefficients 116 can be used in a minimum size. The architecture of the A/D converter bank 54 can be simplified. The power consumption of the A/D converter bank 54 can be reduced. This A/D converter bank system 54 is also aliasing free, no phase distortion, but has amplitude distortion as shown in equation (6). This A/D converter bank system 54 is also able to eliminate the narrow interference within each branch by using the Mth frequency band digital FIR filter $H(z^M)$ 116.

Figure 6:
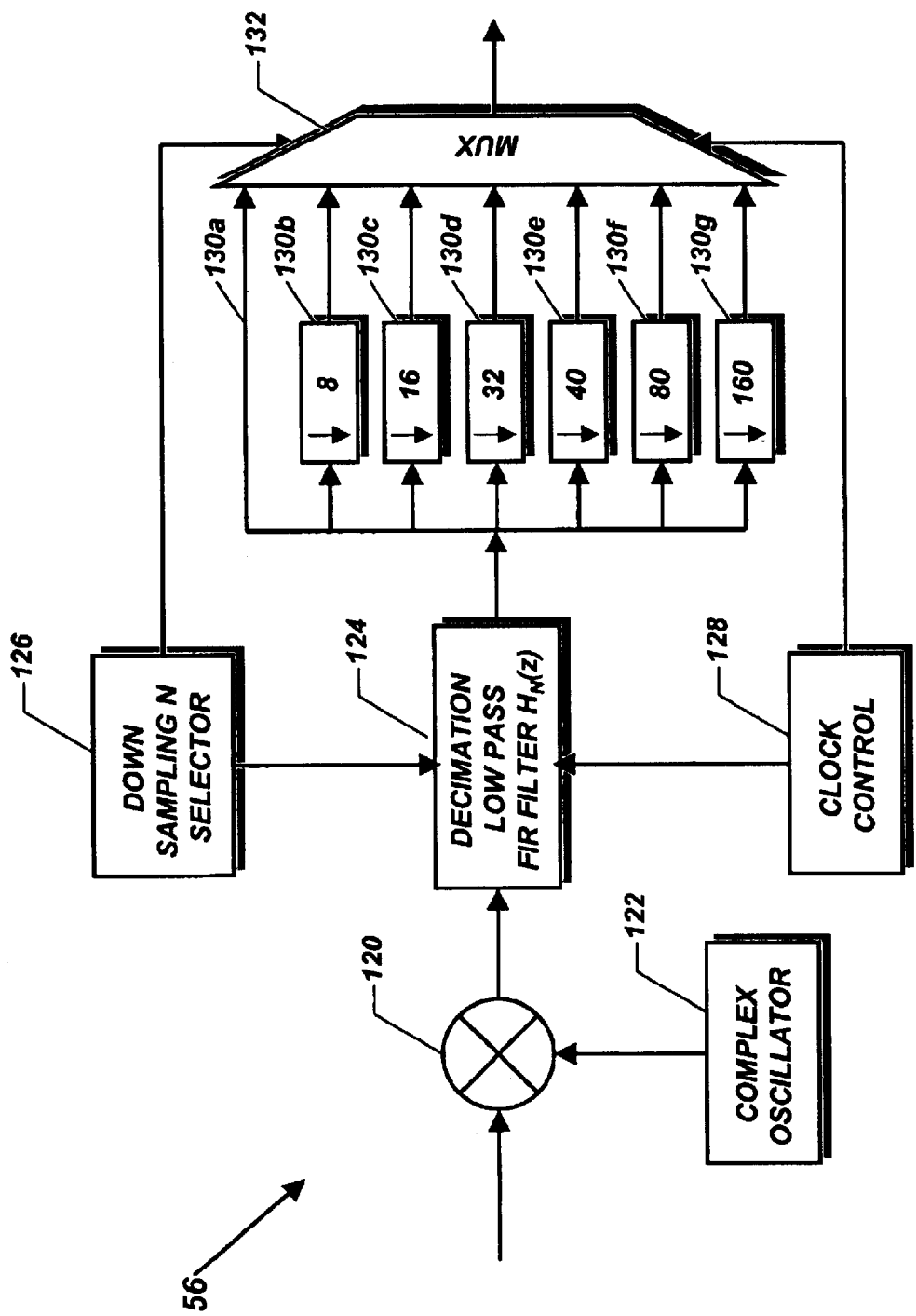
FIG. 6 is a block diagram of showing one embodiment of the present invention, including a complex multiplier, a complex oscillator, a decimation lowpass FIR filter $H_N(z)$, a down sampling N selector, a clock control, and a set of down sampling with a selectable MUX function.

Referring to FIG. 6, one embodiment of the present invention is called the digital down conversion (DDC) 56. The DDC 56 works by first shifting the ultra wideband signals with a frequency range from 3.1 GHz to 10.6 GHz of interest to baseband signals by using the complex multiplying 120 the received signals of the scalable A/D converter 54 by a complex oscillator 122. The baseband signals of output of the complex multiplier 120 are passed through the decimation lowpass FIR filter $H_N(z)$ 124, which is controlled by the clock control 128 and is selected one of the down sampling N (N=8, 16, 32, 40, 80, 160) for the filter cutoff frequency by using the down sampling N selector 126. The output signals from the decimation lowpass FIR filter $H_N(z)$ 124 are then passed one of the down sampling blocks 130a–130g through the selectable MUX 132, which is controlled by the clock control 128 and the down sampling N selector 126. Thus, the selectable MUX 132 produces one of the data rates of 1 Gbps, 500 Mbps, 250 Mbps, 200 Mbps, 100 Mbps, 50 Mbps based on the down sampling blocks 130b, 130c, 130d, 130e, 130f, 130g, respectively.

Figure 7:
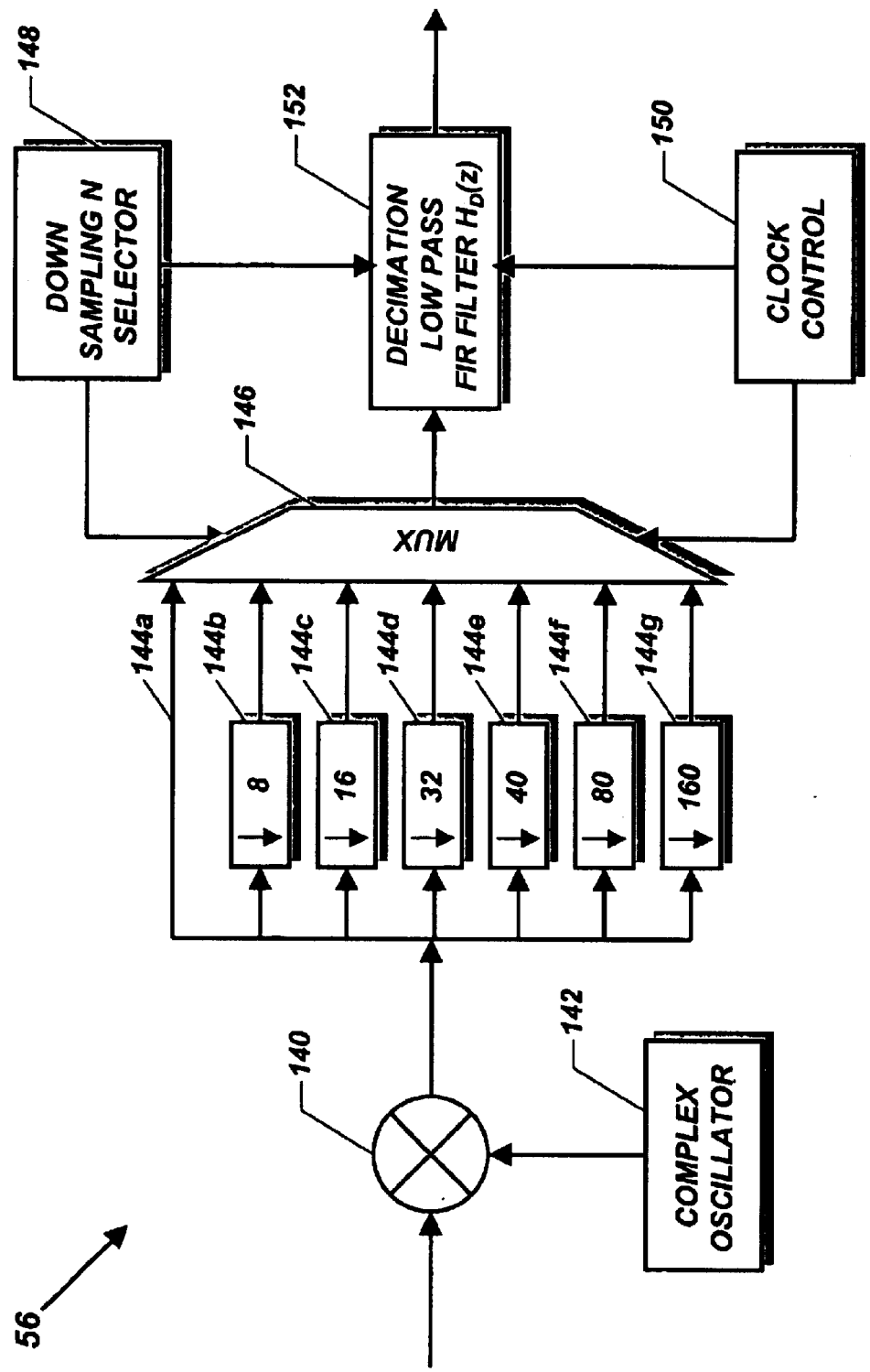
FIG. 7 is a block diagram of showing one embodiment of the present invention, including a complex multiplier, a complex oscillator, a decimation lowpass FIR filter $H_D(z)$, a down sampling N selector, a clock control, and a set of down sampling with a selectable MUX function.

In accordance with another embodiment of the present invention 56, shown in FIG. 7, the down sampling blocks 144a–144g in the DDC 56 are implemented before the decimation lowpass filter FIR filter $H_D(z)$ 152, which is designed to be a Nth-band decimation lowpass FIR filter $H_D(Z^N)$. Thus, the operation of the decimation lowpass filter FIR filter $H_D(z)$ 152 is based on the low sampling rate to achieve the efficient implementation.

Referring to FIG. 7, one embodiment of the present invention of the DDC 56 operates by first shifting the interested ultra wideband (3.1 GHz to 10.6 GHz) to the baseband signals by using the complex multiplying 140 the received signals of the scalable A/D converter 54 by a complex oscillator 142. The output baseband signals of the complex multiplier 140 are passed one of the down sampling blocks 144a–144g through the selectable MUX 146. The selectable MUX 146 is controlled by the clock control 150 and the down sampling N selector 148 for selecting one down sampling rate N, (including N=8, 16, 32, 40, 80, 160). Then, the output signals of the selectable MUX 146 are passed through the decimation lowpass FIR filter $H_D(z)$ 152 to produce one of the band-limited signal with the data rates of 1 Gbps, 500 Mbps, 250 Mbps, 200 Mbps, 100 Mbps, 50 Mbps based on the down sampling blocks 144b, 144c, 144d, 144e, 144f, 144g, respectively.

While the present inventions have been described with respect to a limited number of embodiments, those skilled in the art will appreciate numerous modifications and variations therefrom. It is intended that the appended claims cover all such modifications and variations as fall within the true spirit and scope of these present inventions.

What is claimed is:

1. An analog-to-digital (A/D) converter bank based ultra wideband (UWB) receiver comprising:

a low noise amplifier (LNA) coupled to an anti-aliasing analog filter;

an A/D converter bank with a sampling frequency rate of $F_s$;

a digital down conversion coupled to a rake receiver and a channel estimate;

a template pulse generator coupled to the rake receiver to calculate a correlation between a received monocycle pulse and an ideal monocycle pulse;

a sequence generator coupled to the template pulse generator;

a synchronization coupled to the template pulse generator; and a clock control coupled to the A/D converter bank, the digital down conversion and the template pulse generator.

2. The A/D converter bank based UWB receiver of claim 1 wherein the A/D converter bank with a sampling frequency rate of $F_s$ includes:

M A/D converters, where M is an integer;

an analyzed sequence switch rotating at uniform speed in a counterclockwise direction to provide downsampling signal to the M A/D converters;

the M A/D converters coupled to M adaptive amplifiers;

the M adaptive amplifiers coupled to M digital FIR filters with different phases; and the M digital FIR filters to provide information to a synthesized sequence switch rotating at uniform speed in a clockwise direction to create one upsampling digital sequence.

3. The A/D converter bank based UWB receiver of claim 2 wherein the M A/D converters cascaded to the M adaptive amplifiers are in parallel structure and operate at a sampling frequency rate of $F_s/M$, where M is an integer.

4. The A/D converter bank based UWB receiver of claim 2 wherein the M A/D converters have B bits resolution, where B is an integer, greater than 3 and less than 11.

5. The A/D converter bank based UWB receiver of claim 2 wherein said analyzed sequence switch is a interleaver downsampling processing to divide a single sequence of a length of L into M parallel signal sequences of a length of L/M for the M A/D converters.

6. The A/D converter bank based UWB receiver of claim 2 wherein said synthesized sequence switch is a deinterleaver upsampling processing to combine M parallel signal sequences of a length of L/M into a signal sequence of a length of L from the M different digital FIR filters with different phases.

7. The A/D converter bank based UWB receiver of claim 2 wherein K of the M adaptive amplifiers are set to −50 dBm to eliminate radio interference from 5.15 GHz to 5.35 GHz and/or from 5.725 GHz to 5.825 GHz, where K is less than M, both of K and M are integers.

8. The A/D converter bank based UWB receiver of claim 1 wherein the A/D converter bank with a sampling frequency rate of $F_s$ further includes:

M A/D converters with a sampling frequency of $F_s/M$, where M is an integer;

an downsampling polyphase switch to provide L/M samples to every one of the M A/D converters, where L is a total of samples and an integer;

M adaptive amplifiers, where K of the M adaptive amplifiers setting to −50 dBm within the frequency ranges from 5.15 GHz to 5.35 GHz and from 5.725 GHz to 5.825 GHz, to provide information to an upsampling polyphase switch to create one digital sequence of L samples; and the upsampling polyphase switch coupled to a Mth frequency band digital FIR filter $H(z^M)$.

9. The A/D converter bank based UWB receiver of claim 8 wherein the Mth frequency band digital FIR filter $H(Z^M)$ has one zero tap in every of M filter coefficients with a linear phase and symmetric in the discrete-time domain and has M frequency bands in the frequency domain.

10. The A/D converter bank based UWB receiver of claim 1 wherein the template pulse generator contains Gaussian monocycle pulses with ultra-short different frequencies.

11. The A/D converter bank based UWB receiver of claim 1 wherein the digital down conversion (DDC) includes:

a complex multiplier of controlling by a complex oscillator;

the complex multiplier coupled to a decimation lowpass FIR filter;

the decimation lowpass FIR filter coupled to N down sampling unit;

the N down sampling unit coupled to a selectable MUX unit;

a clock control coupled to the decimation lowpass FIR filter and the selectable MUX unit; and a down sampling N selector controls the decimation lowpass FIR filter and the selectable MUX unit.

12. The A/D converter bank based UWB receiver of claim 11 wherein the N down sampling unit connects to a direct pass line, a down sampling of 8, a down sampling of 16, a down sampling of 32, a down sampling of 40, a down sampling of 80, and a down sampling of 160 in a parallel form.

13. The A/D converter bank based UWB receiver of claim 11 wherein the decimation lowpass FIR filter is a symmetric and programmable-tap digital filter and operates at different sampling frequencies to provide a set of scalable passband, stopband and cutoff frequency bands.

14. The A/D converter bank based UWB receiver of claim 1 wherein the digital down conversion further includes:

a complex oscillator coupled to a complex multiplier;

the complex multiplier coupled to a selectable MUX unit, a down sampling of 8, a down sampling of 16, a down sampling of 32, a down sampling of 40, a down sampling of 80, and a down sampling of 160;

the MUX unit coupled to a Nth frequency band decimation lowpass FIR filter;

a clock control coupled to the Nth frequency band decimation lowpass FIR filter and the selectable MUX unit; and a down sampling N selector coupled to the Nth frequency band decimation lowpass FIR filter and the selectable MUX unit.

15. The A/D converter bank based UWB receiver of claim 14 wherein the Nth frequency band decimation lowpass FIR filter is a programmable-tap digital filter with one of type symmetric filter coefficients including:

one tap constant value;

one zero tap in every of 8 filter coefficients;

one zero tap in every of 16 filter coefficients;

one zero tap in every of 32 filter coefficients;

one zero tap in every of 40 filter coefficients;

one zero tap in every of 50 filter coefficients; or one zero tap in every of 160 filter coefficients.

16. In ultra wideband transceiver comprising:

an ultra-short pulse generator transmitter further including:

a convolution encoder coupled to a block interleaver in which is coupled to a pulse position modulator;

a sequence generator coupled to a pulse generator in which is coupled to the pulse position modulator;

the pulse position modulator coupled to a pulse shaping FIR filter; and the pulse shaping FIR filter coupled to a digital-to-analog (D/A) converter in which is coupled to a reconstruct filter;

an A/D converter bank based receiver further including:

an A/D converter bank coupled to a digital down conversion in which is coupled to a rake receiver and a channel estimate;

a sequence generator and a synchronization coupled to a template pulse generator in which is coupled to the rake receiver; and the rake receiver coupled to a block deinterleaver in which is coupled to a Viterbi decoder.

17. The ultra wideband transceiver of claim 16 wherein the pulse generator provides time hopping encoded digital Gaussian monocycle pulses.

18. The ultra wideband transceiver of claim 16 wherein the pulse position modulator has scalability to produce 16, 32, 40, 80, or 160 Gaussian monocycle pulses given a time-window.

19. The ultra wideband transceiver of claim 16 wherein the A/D converter bank further interleaverly splits one single input analog sampled signal of a length of L into M input analog sampled signals of a length of L/M for M A/D converters coupled to H adaptive amplifiers in which are also coupled to H different digital FIR filters and then deinterleaverly produces a single digital signal of a length of L from the M output signals of the M different digital FIR filters, where L is greater than M, M and L are integers.

20. The ultra wideband transceiver of claim 19 wherein said A/D converter bank further comprises:

a counterclockwise-switch rotationally connects one of the M A/D converters at a uniform sampled-speed;

M 8-bit A/D converters with the same sampling frequency rate at $F_s/M$;

H different adaptive amplifiers coupled to M different digital FIR filters with different phases;

a single input analog sampled signal with a length of L is interleaved to form M input analog sampled signals with a length of L/M for said M 8-bit A/D converters; and M digital output signal with a length of L/M from said M different digital FIR filters with different phases are deinterleaved to form a single digital output signal with a length of L by rotating a clockwise-switch at the uniform sampled-speed.

* * * * *